United States Patent [19]
Tressler et al.

[11] Patent Number: 6,112,589
[45] Date of Patent: Sep. 5, 2000

[54] FIBER TESTER

[75] Inventors: Richard E. Tressler, Boalsburg, Pa.;
Douglas J. Pysher, St. Paul, Minn.;
Paul M. Benson, Pittsburgh, Pa.;
Darryl Butt, Los Alamos, N. Mex.

[73] Assignee: The Penn State Research Foundation, University Park, Pa.

[21] Appl. No.: 08/856,299

[22] Filed: May 14, 1997

[51] Int. Cl.[7] .............................. G01L 5/04; G01L 5/06; G01L 5/00
[52] U.S. Cl. .................. 73/160; 73/159; 73/826; 73/828; 73/830
[58] Field of Search .............................. 73/830, 828, 826, 73/159, 160

[56] References Cited

U.S. PATENT DOCUMENTS

| | | | |
|---|---|---|---|
| 1,512,491 | 10/1924 | Scott | 73/160 |
| 2,436,317 | 2/1948 | Manjoine | 73/159 |
| 2,534,980 | 12/1950 | Lubahn | 73/15.6 |
| 2,545,482 | 3/1951 | Manjoine et al. | 73/160 |
| 2,834,204 | 5/1958 | Braunlich | 73/159 |
| 2,942,455 | 6/1960 | Smith | 73/15.6 |
| 3,136,158 | 6/1964 | Wharff et al. | 73/157 |
| 3,813,919 | 6/1974 | Taniguchi et al. | 73/826 |
| 3,922,903 | 12/1975 | Bornstein et al. | 73/160 |
| 4,018,080 | 4/1977 | Fletcher et al. | 73/159 |
| 4,114,420 | 9/1978 | Browning | 73/159 |
| 4,392,384 | 7/1983 | Yquel | 73/830 |
| 4,884,456 | 12/1989 | Meline et al. | 73/826 |
| 5,167,150 | 12/1992 | Shofner et al. | 73/160 |
| 5,249,471 | 10/1993 | Kizaki et al. | 73/826 |
| 5,286,108 | 2/1994 | Whatley et al. | 374/49 |

*Primary Examiner*—Hezron Williams
*Assistant Examiner*—Dennis Loo
*Attorney, Agent, or Firm*—Thomas J. Monahan

[57] ABSTRACT

Disclosed is a fiber testing apparatus which permits creep and strength testing of one or more fibers in a controlled environment, including a vacuum, at high temperatures. Components of the fiber tester provide for accurate measurement of the effects on the fiber(s) being tested when exposed to a chosen environment. The fiber tester includes a furnace system, fiber testing system, a fixed sample, a environmental control system, a mass flow control system, a Computer Data Acquisition and Control (CDAC) system, and a support system. Most of these systems are contained in a test chamber which is part of the environmental control system. These systems of the fiber tester allow various types of mechanical tests to be performed on one or more fibers under a variety of environmental conditions not previously achievable.

8 Claims, 10 Drawing Sheets

FIBER TESTER

BACKGROUND

With the advent of fiber reinforced composite materials, it is necessary to analyze the mechanical behavior of the fibers used in the composites. Most techniques for testing single fibers or filaments at room temperature have involved either the direct gripping of fibers, the gripping of a tab attached to the fiber, or a combination thereof. Most techniques using a tab are based on a standard test method 337913 of the American Society for Testing and Materials. Some of these single filament test methods have been adapted for high temperature tests in air. Data from high temperature tests is useful for understanding fiber behavior in air under oxidizing conditions encountered during composite use. Unfortunately, the fibers may encounter much different environments during fabrication and use if they react with a matrix or undergo internal chemical reactions which evolve gaseous species. Under these conditions, it is desirable to test the fibers in the environment to which they are expected to be exposed.

Current evaluations of the mechanical behavior of fibers which include tensile strength, elastic modulus, stress-rupture and creep-rupture under non-ambient conditions have been performed by two types of methods. The first, heat treatment methods, have involved exposure of the fiber to heat in a controlled environment or vacuum, and then subsequently removing and testing the fiber at room temperature. Such methods only simulate in situ fiber behavior. The second, high temperature methods, actually test the fiber at an elevated temperature, but not in a controlled environment. There have been few analyses of the mechanical behavior of fibers at elevated temperature under an explicitly controlled environment due to the complexity of controlling the environment around the fiber during heating.

It is an objective of this invention to provide an apparatus for testing one or more fibers in a controlled environment. It is a further objective to provide an apparatus with improved measuring capabilites in a controlled environment.

SUMMARY OF THE INVENTION

The present invention provides a first embodiment of a fiber tester having a test chamber base which includes at least one sealed electrical feed-through and at least one sealed gas feed-through. Mounted to the base is a test frame having a top, middle and bottom. A micropositioner support is at the top of the test frame. A furnace support is at the middle of the teat frame and has a passage in it allow the fiber to pass through. A load cell is mounted to the base under the passage of the furnace support. A bottom sample attachment is connected to the load cell for receiving a bottom end of the fiber. A micropositioner is mounted to the micropositioner support and extends from the passage of the micropositioner support toward the load cell. The micropositioner includes a motor and an encoder to measure movement of the motor. A top sample attachment extends from the micropositioner and toward the load cell for receiving a top end of the fiber. A furnace is mounted to the furnace support, so that it is between the micropositioner and the load cell. There is a passage in the center of the furnace for receiving at least one fiber. An enclosure is used to enclose the base and the components of the test frame. A seal around the edge of enclosure seals the junction of the enclosure and the base.

Another embodiment includes a different method of mounting the furnace. This embodiment does not have a furnace support mounted to the test frame nor is the furnace mounted to the test frame. Instead, a moving support column is used. The support column is mounted to a support column base. A slide base, mounted to the test chamber base, slidably receives the support column base. A handle is mounted to the support column to aid in sliding the support column toward the test frame. A pin base is mounted to an end of the slide base which is between the support column and the test frame. A pin extends from the pin base. The furnace is dividable into two separate halves and has an arm mounted to each half. The arms interconnect each half of the furnace to the support column. There is an indentation in each arm for receiving the pin and a spring interconnected between each arm and the support column for forcing the arms together.

DETAILED DESCRIPTION

The present invention provides a fiber tester to test one or more fibers under a controlled environment, including a vacuum, to temperatures in excess of 1300° C. The fiber tester can monitor creep displacement of filaments under a load and can be configured to allow strength measurements under conditions of constant displacement rate. Components of the fiber tester provide for accurate measurement of the effects on the fiber(s) being tested when exposed to a chosen environment.

The fiber tester includes a furnace system, fiber testing system, a fixed sample, a environmental control system, a mass flow control system, a Computer Data Acquisition and Control (CDAC) system, and a support system. Most of these systems are contained in a test chamber which is part of the environmental control system. These systems of the fiber tester allow various types of mechanical tests to be performed on one or more fibers under a variety of environmental conditions not previously achievable. Each of these systems and its capabilities will be discussed as employed in a prototype of the fiber tester 10 shown in FIGS. 1–6.

Figure 1:
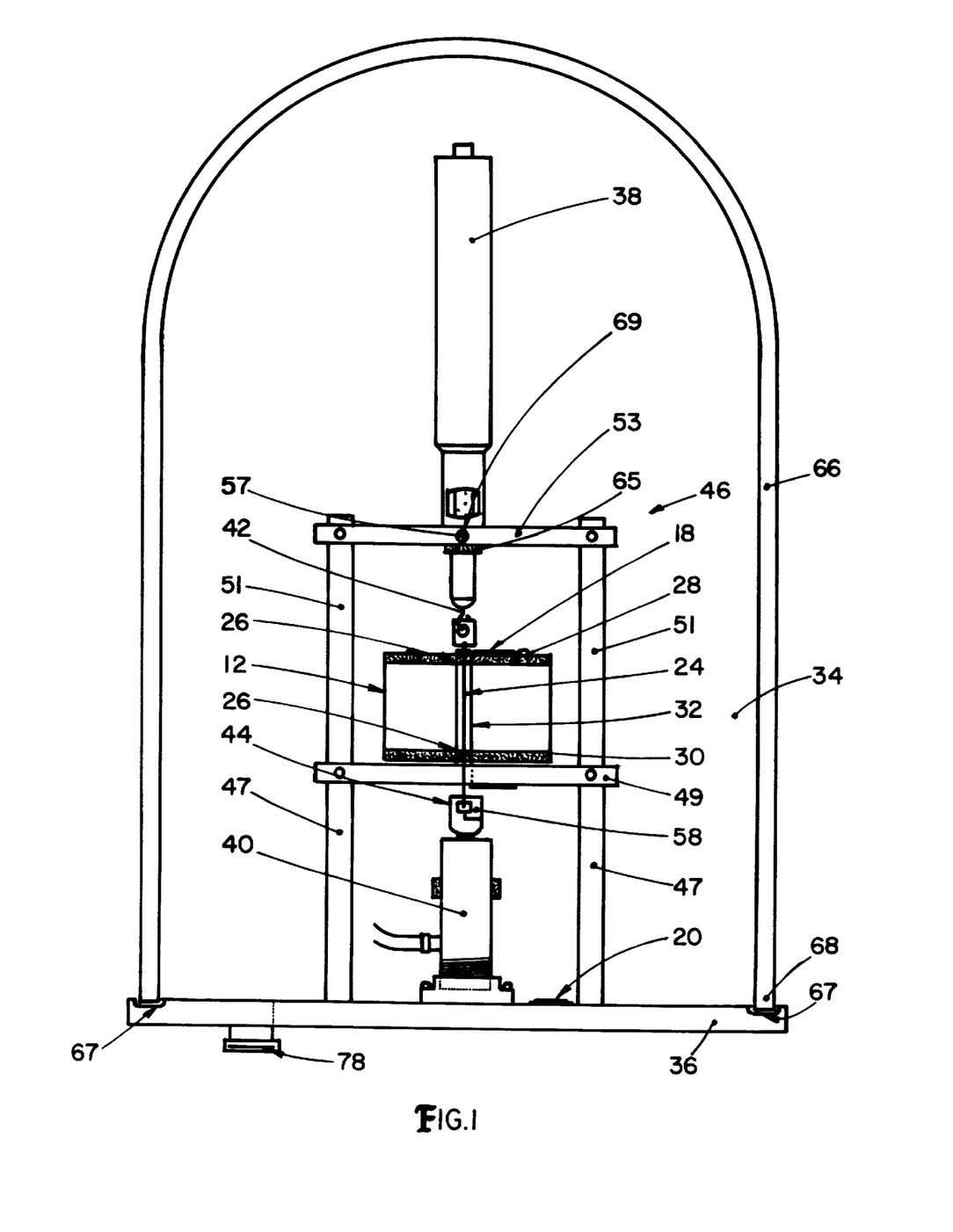
FIG. 1 is a front view of the test chamber of a first embodiment of the fiber tester.
Figure 5:
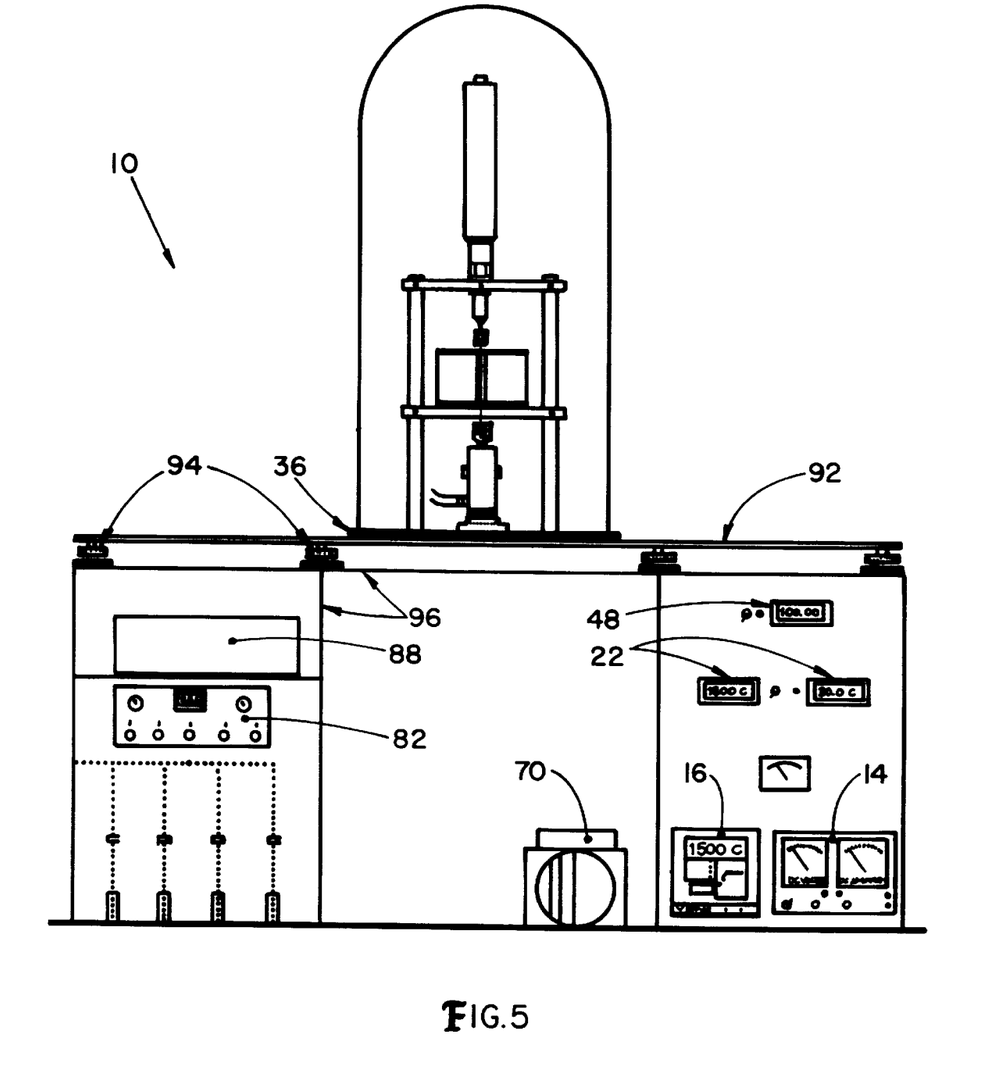
FIG. 5 is a front view of the first embodiment of the fiber tester.
Figure 6:
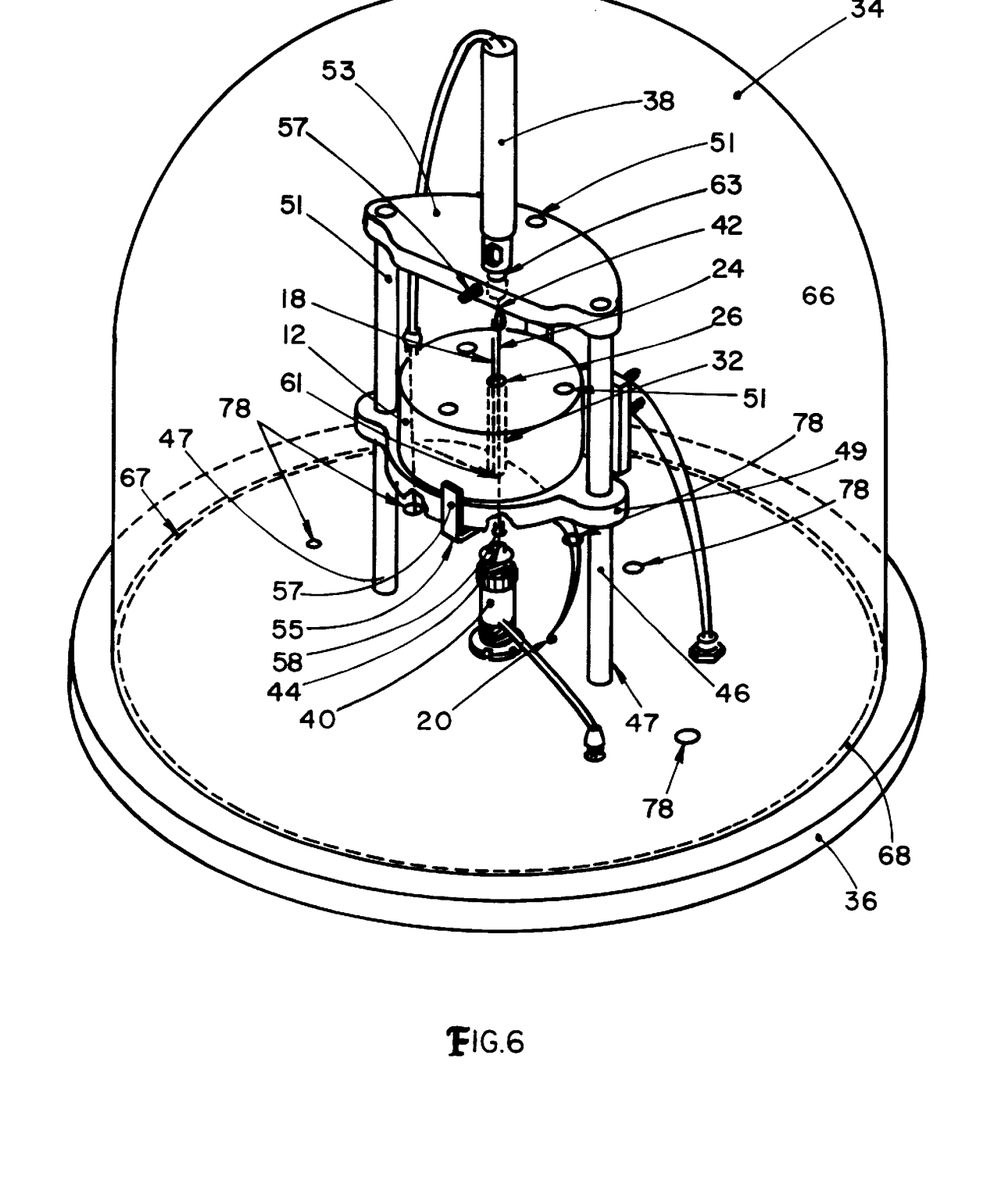
FIG. 6 is a prespective top view of the test chamber shown in FIG. 1.
Figure 7:
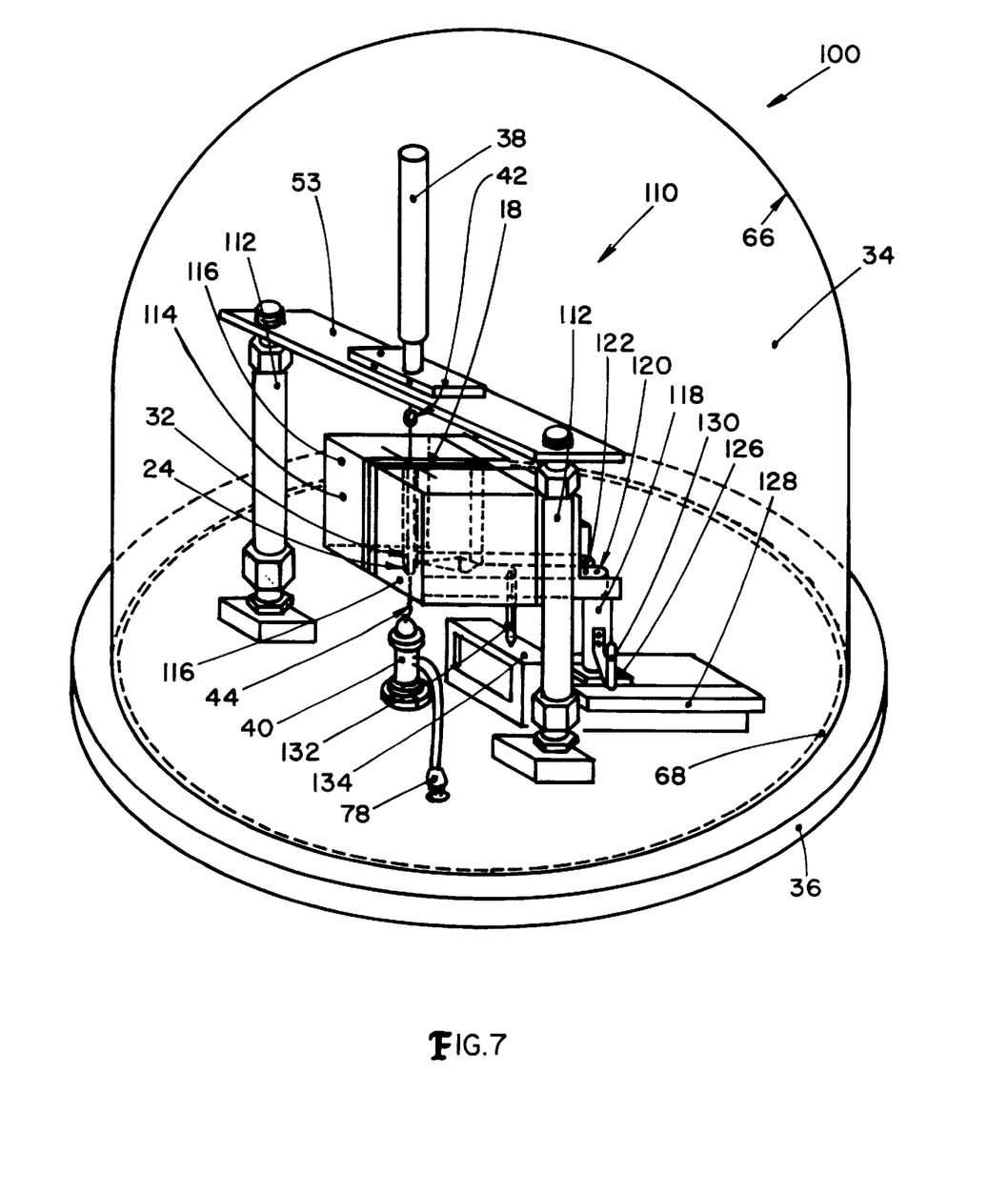
FIG. 7 is a prespective top view of the test chamber according to another embodiment of the invention.
Figure 8:
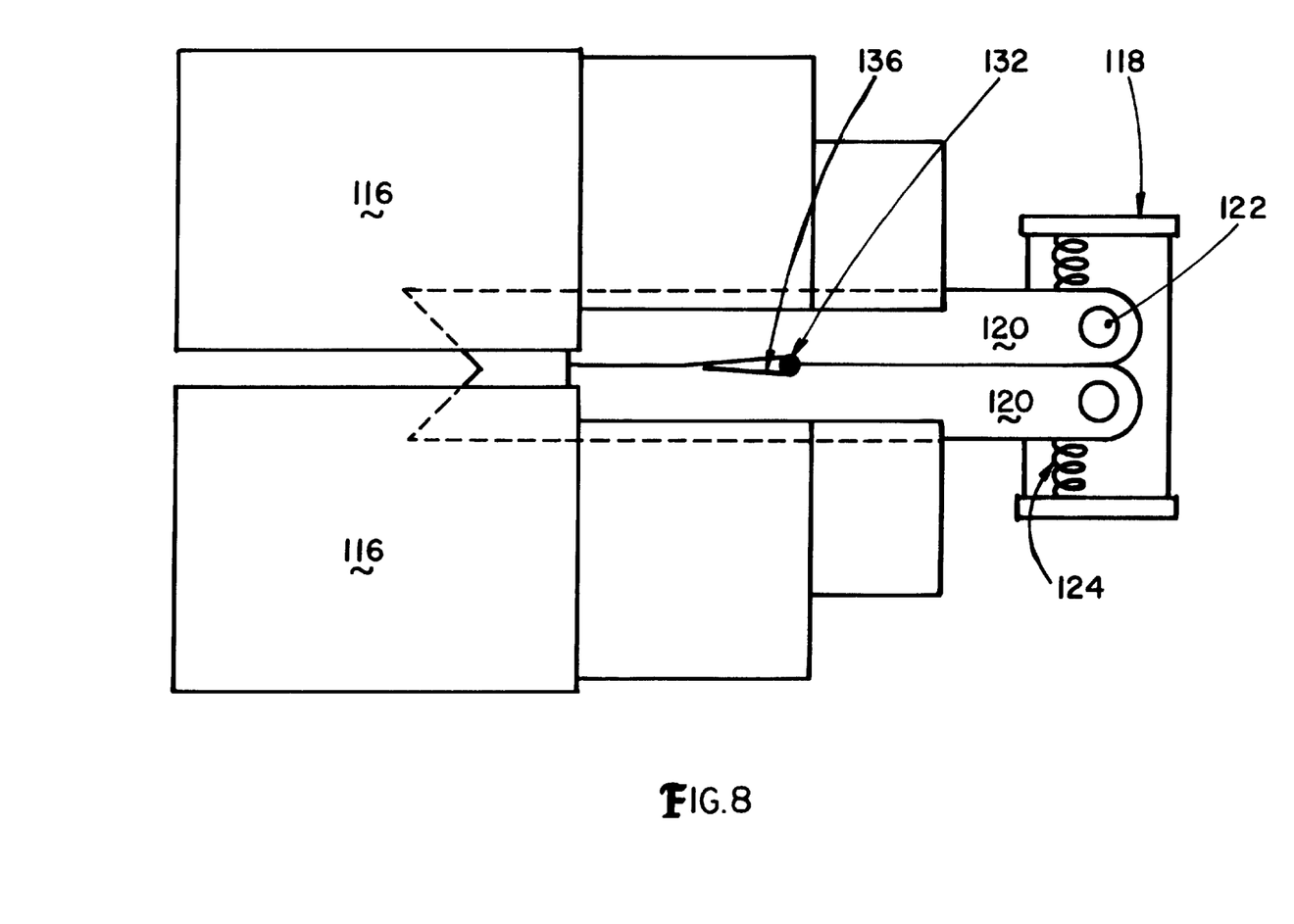
FIG. 8 a top view of the furnace support system shown in FIG. 7.
Figure 9:
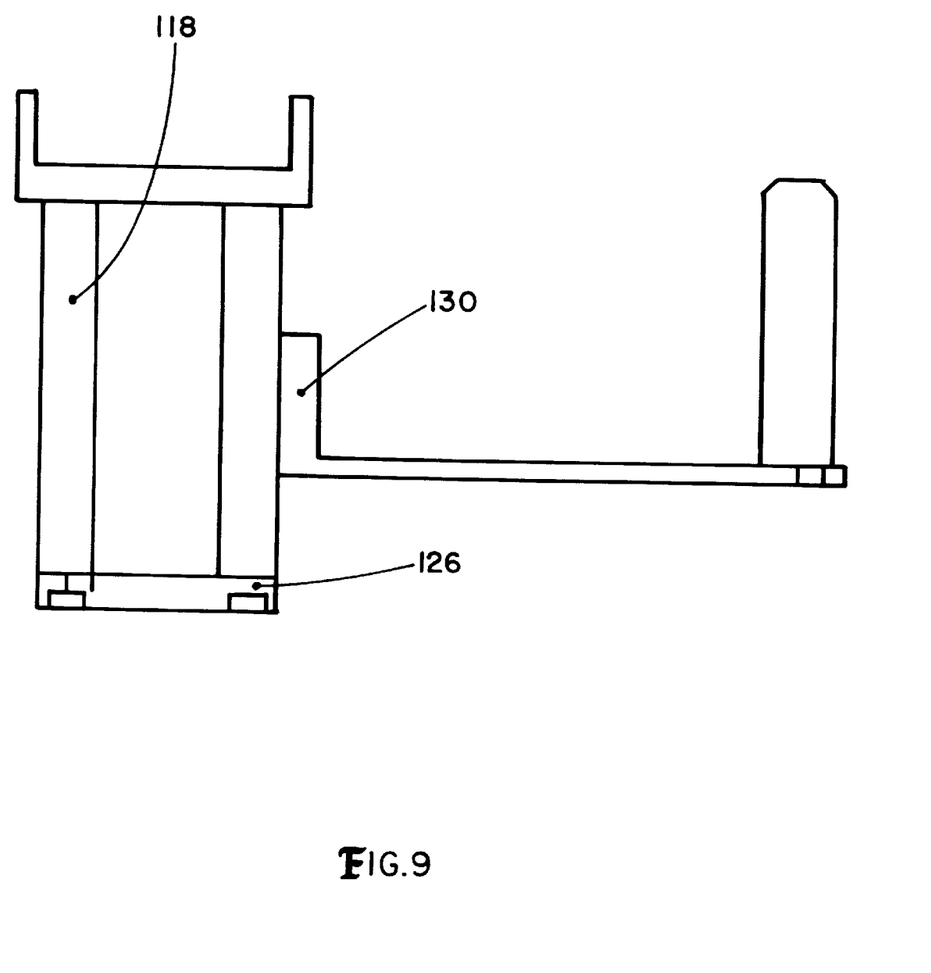
FIG. 9 is a front view of a support column shown in FIG. 7.

The Furnace System includes a resistance tube furnace 12, a DC power supply 14, a programmable controller 16, an S-type thermocouple 18, a K-type thermocouple 20, and two digital temperature readers 22, as shown in FIGS. 1 and 5–6. The furnace system provides an accurately controlled heat source. This allows the mechanical testing of one or more fibers 24 to be performed at elevated temperatures. The resistance tube furnace 12 includes wire (not shown) wound around the outside of a small alumina tube in order to provide resistance heating. The wire wound around the furnace 12 of the prototype was 60% platinum and 40% rhodium. A zirconia board (not shown) immediately adjacent to and encasing the wire wound around the alumina tube provides a high temperature insulation. The zirconia board is encased with insulation (not shown) rated for a lower temperature to provide additional insulation. A stainless steel cylinder provided an outside shell and mechanical support for the above mentioned components of the furnace 12. Transite board at top end 28 and bottom end 30 of the outside shell was utilized to fully enclosed the furnace 12. Each transite board includes a hole 26 in its center. The hole 26 of each transite board is aligned with a tube passage 32. The tube passage 32 is in the center of the furnace 12 and formed by the alumina tube. The holes 26 provide access to the tube passage 32 for inserting the fiber(s) 24 to be tested. One of the advantages associated with this type of furnace 12 is that it provides a hot zone. The hot zone is defined as a zone with a uniform temperature along the length of the fiber(s) 24 being tested.

The DC power supply 14 converts an AC supply of 115 VAC into the necessary current and voltage to be supplied to terminals 13 of the furnace 12. The programmable controller 16 provides the regulation of voltage to the DC power supply 14 in order to control heating rate and set point temperature within the furnace 12. A total of four heating cycles were available from the programmable controller 16, each having a ramp and a dwell stage. In addition, the programmable controller 16 includes a RS-232 communications port for communication with the CDAC system, so that the furnace 12 can be controlled remotely by the CDAC system.

The temperature within the hot zone of the furnace 12 is monitored by the S-type thermocouple 18. The S-type thermocouple 18 is positioned just inside the tube passage 32, so that it is in the hot zone and in close proximity to the test fiber(s) 24. The temperature inside the test chamber 34 is monitored by a K-type thermocouple 20 placed near the base 36 of the test chamber 34. The monitoring by the K-type thermocouple 20 aids in preventing excessive temperatures in the test chamber 34 which may damage the electronics or other components contained in the test chamber 34. The digital temperature readers 22 are outside of the test chamber 34 and are link to the S-type and K-type thermocouples 18, 20 in order to provide temperature data during fiber testing.

The fiber testing system of the prototype is shown in FIG. 1 and 6. The fiber testing system includes a micropositioner 38, a ±100 gram DC force transducer load cell 40, a top sample attachment 42, a bottom sample attachment 44, and a testing frame 46. The micropositioner 38 is commercially available, but has not been used before in this type of environmentally controlled application. The function of the micropositioner 38 is to apply a load to the fiber(s) 24 in a precise, controllable fashion as well as measure fiber elongation. The basic operating principle of the micropositioner 38 is as follows. A DC servo motor in the micropositioner 38 provides rotational motion. The rotational motion is translated into linear motion by a gearhead and precisely machined lead screw, which are both part of the micropositioner 38. The motor speed may be controlled by varying the applied potential to the motor. A wide range of interchangeable gearheads, ranging in ratios from 11.8:1 to 235,067:1, are available enabling the motor to operate over an extremely wide range of maximum speeds. Choice of a particular gearhead(s) depends on the user's testing needs. Low ratio gearheads allow for relatively fast maximum speeds but offer relatively poor positional resolution, while high ratio gearheads function conversely. An integral magnetic encoder of the micropositioner 38 provides accurate measurement of the linear translation of the motor and thus elongation of the fiber 24. In the case of the prototype, the encoder generates sixtyfour (64) voltage pulses or counts for each revolution of the motor. Knowing the gearhead ratio and the pitch of the lead screw enables calculation of linear travel for a given number of counts. Acceleration and velocity are monitored and controlled by measuring the rate of counts in a known time period.

The load cell 40 is mounted to the base 36 and measures the applied load on the fiber(s) 24 being tested. The load cell 40 of the prototype includes its own power supply and a digital reader 48. A commercially available Linear Variable Differential Transformer force transducer was employed with the prototype. Similar load cells, having the same physical dimensions with capacities ranging from ±10 grams to ±10 Kg are also available, thus enabling fibers which exhibit a wide range of strengths to be tested.

For testing a fiber(s) 24, a fixed sample 50 is suspended by the top sample attachment 42. In this case of the prototype, the top attachment 42 is a hook. The top sample attachment 42 is interconnected to the motor by an actuator of the micropositioner 38 which enables linear motion to be transferred from the motor to the fiber(s) 24. Vertical alignment is achieved by visual examination of the suspended fiber(s) 24. The transfer of load from the fixed sample 50 to the load cell 40 is accomplished by the bottom sample attachment 44. In the case of the prototype as shown in FIG. 1, a grip is employed as the bottom sample attachment 44.

The test frame 46 of the prototype is a simple frame work that attaches to the base 36, as shown in FIGS. 1 and 6. The test frame 46 has two rods 47 threaded into the base 36 and into furnace support 49. Three rods 51 are threaded in to the furnace support 49 and a micropositioner support 53. One of two L brackets 55 is shown fastened to the furnace support 49. Set screws 57 are used with the L brackets 55 to secure the furnace 12 from movement. The furnace support 49 includes a furnace support hole 61 to allow passage of the fiber(s) 24 to the load cell 40. The micropositioner support 53 includes a micropositioner support hole 63 for insertion of the micropositioner 38. The micropositioner 38 is secured to the micropositioner support 53 by a nut 65 that screws on to the micropositioner 38 and a set screw 57 that screws into a set screw hole 69 in the micropositioner support 53.

Figure 2:
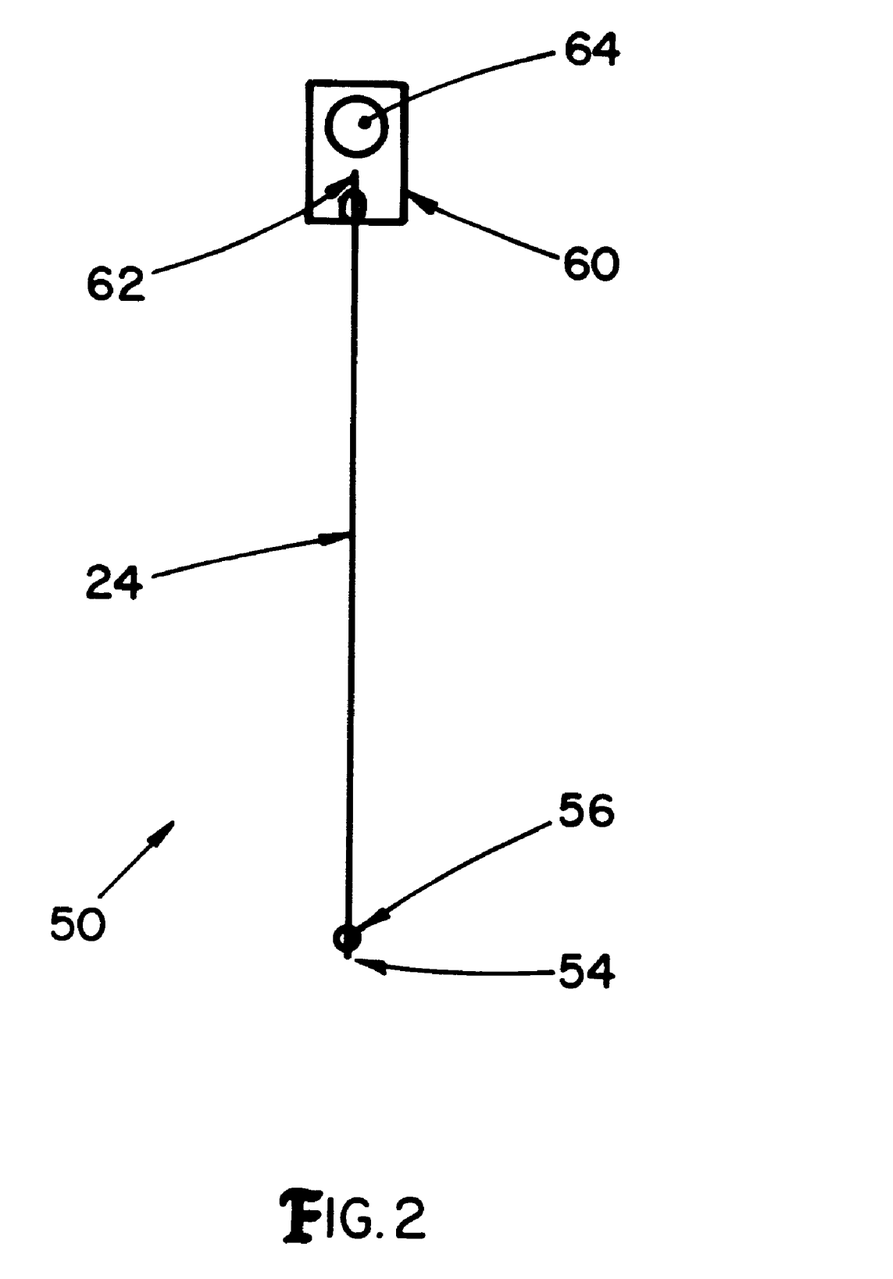
FIG. 2 is a front view of a fixed sample.

A schematic of the fixed sample 50 is shown in FIG. 2, which includes the fiber(s) 24. On lower end 54 of the fiber(s) 24, a bead 56 is formed from epoxy or other suitable material. The bead 56 should be small enough to be passed through holes 26 of the transite board and the tube passage 32 of the furnace 12. The bead 56 ideally has a radius of curvature and a compliance that will allow conformity to the conical taper 58 machined into the underside of the bottom sample attachment 44. A manila tab 60 is attached by epoxy to an upper end 62 of the fiber(s) 24. A hole 64 in the tab 60, that is colinear with the fiber(s) 24, allows the fixed sample 50 to be suspended from the top sample attachment 42. The length of the fixed sample 50, from the bottom of the tab 60 to the epoxy bead 56, should be long enough to allow sufficient clearance of both ends 54, 62 of the fiber(s) 24 from the furnace 12.

Figure 3:
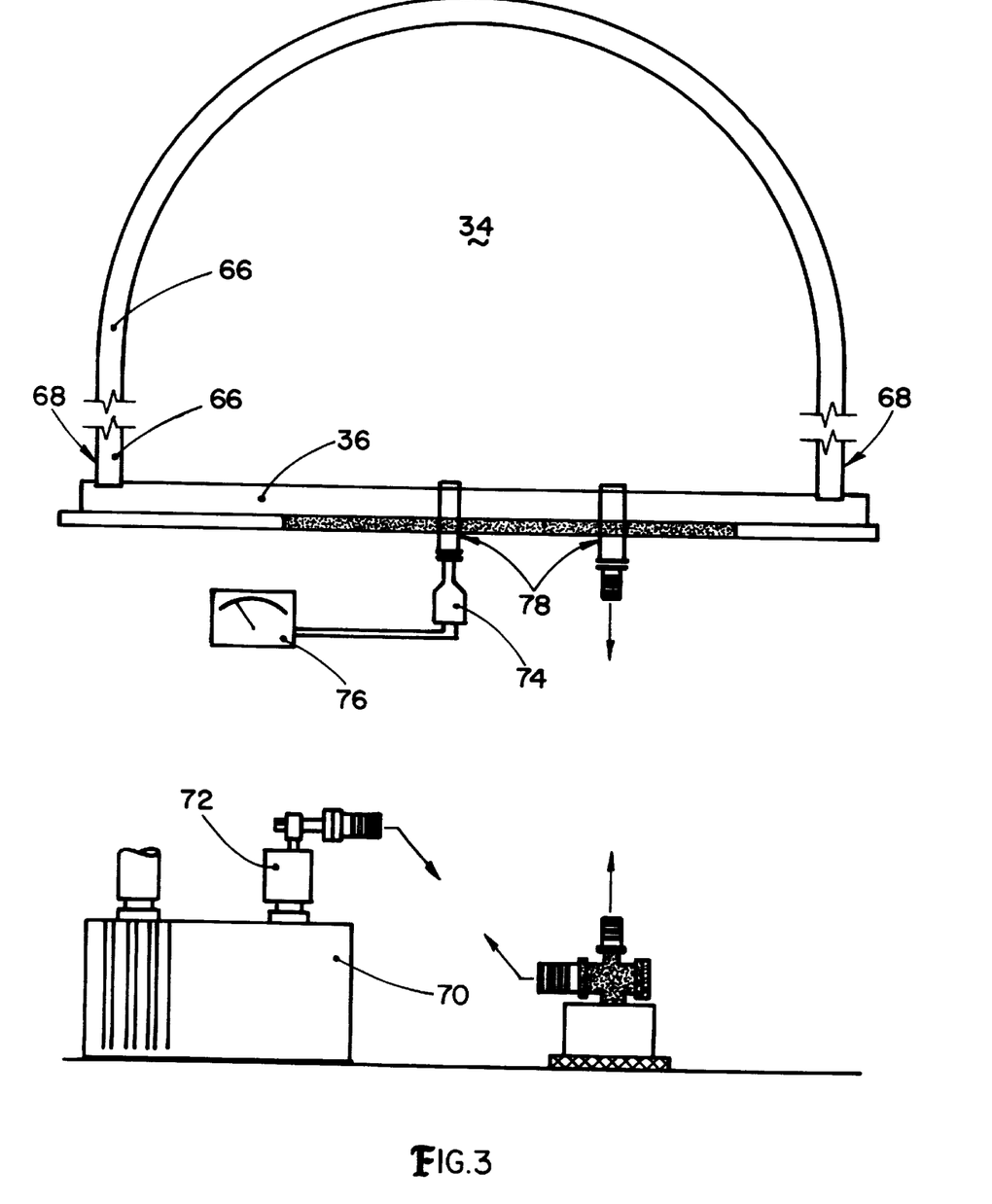
FIG. 3 is a schematic front view of some of the components connected to the first embodiment shown in FIG. 1.

The environmental control system is shown in FIG. 3. The environmental control system includes the base 36, an enclosure 66, a seal 68, vacuum pump 70, alumina trap 72, Pirani gauge 74, panel mounted meter 76, and sealed electrical and gas feed-throughs 78. The components of the environmental control system provide vacuum capability to the fiber tester 10. For the prototype, a bell jar was used for the enclosure 66, a viton gasket was used as the seal 68 and a stainless steel plate was used as the base 36. The base 36 includes a groove 67 cut into it that receives the enclosure 66. The weight of the enclosure 66 seals the assembly of the enclosure seal 68 and the base 36. The bell jar with the viton gasket about its bottom edge, in conjunction with the steel plate and the groove 67 provides a test chamber 34 in which the fiber testing system and furnace system are contained in a controlled environment. The Pirani gauge 74 and meter 76 are collectively used to monitor the pressure within the test chamber 34. The alumina trap 72 adsorbs high molecular weight hydrocarbons from the pump oil of the vacuum pump 70, thus preventing the back streaming of the hydrocarbons into the test chamber 34. The feed-throughs 78 allow electrical links to the systems inside the test chamber 34 and the addition or removal of gas to the test chamber 34. The feed-throughs 78 are also used as ports for adding or removing pressure in the test chamber 34.

Figure 4:
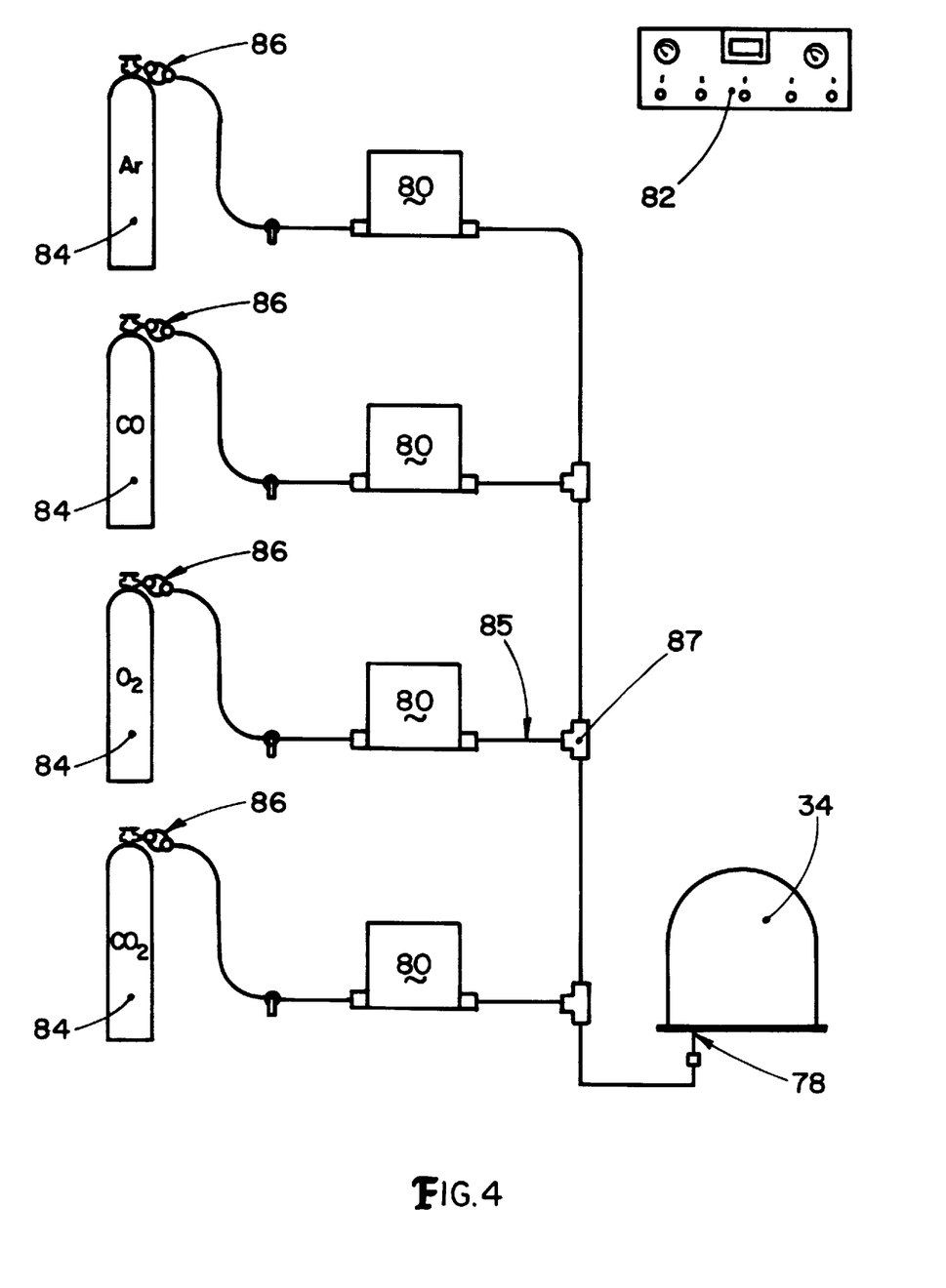
FIG. 4 is schematic view of a multi flow control system according to the invention.

A schematic of the mass flow control (MFC) system is shown in FIG. 4. The mass flow control system of the prototype includes four (4) mass flow controllers 80 for four (4) different gases, a five (5) channel single readout power supply 82, four (4) ultra high purity gas supplies 84, four (4) regulators 86, and assorted stainless steel tubing 85 and connectors 87. The MFC system provides precise flow control of one or more gases into the test chamber 34. For testing of the prototype, four gas supplies 84 of argon, carbon dioxide, carbon monoxide and oxygen were used to supply a combination of gases to the test chamber 34. The types of gases used and number of gas supplies were for testing purposes only and can be configured as to the type of gases and number of supplies to produced a desired environmental condition in the test chamber 34.

The CDAC system of the prototype includes an IBM PC/AT computer 88 with CGA display monitor, mouse, a motion control board, a multifunction data acquisition board, and the CDAC software. The CDAC system provides computerized acquisition of data during fiber testing. In addition, the CDAC system monitors position and controls motor/encoder movement of the micropositioner 38. This provides the closed loop control necessary to perform constant load stress creep and other tests. The motion control board provides the necessary analog voltage to drive the motor of the micropositioner at a user-programmed linear velocity. In addition, the motion control board monitors voltage pulses received from the encoder to allow control of the motor velocity and acceleration as well as the monitoring of the linear displacement. The multifunction data acquisition board includes assorted signal conditioning modules and cables, and is used to convert analog voltage signals from instruments of the fiber tester into digital signals that the computer 88 can manipulate into useful test information. Examples of such information are stress, strain, modulus, etc. The multifunction data acquisition board of the prototype utilized a 12 bit digital-to-analog converter (DAC), which provided a resolution of 1/212 (1/4096) of its full scale value for any voltage input (usually 5 or 10 volts). If a 16 bit DAC were available, a resolution of 1/65536 of full scale would be achievable. The CDAC software serves to log data during a particular test, and provide data analysis and graphing capabilities. In the case of the prototype, Lab Windows was employed as the CDAC software.

A schematic of the support system is shown in FIG. 5, which includes a desk style support frame 90, a top 92, pneumatic mounts 94, and aluminum mounting panels 96. The support system provides vibration isolation of the test chamber 34 as well as physical support of the other systems of the fiber tester 10.

Figure 10:
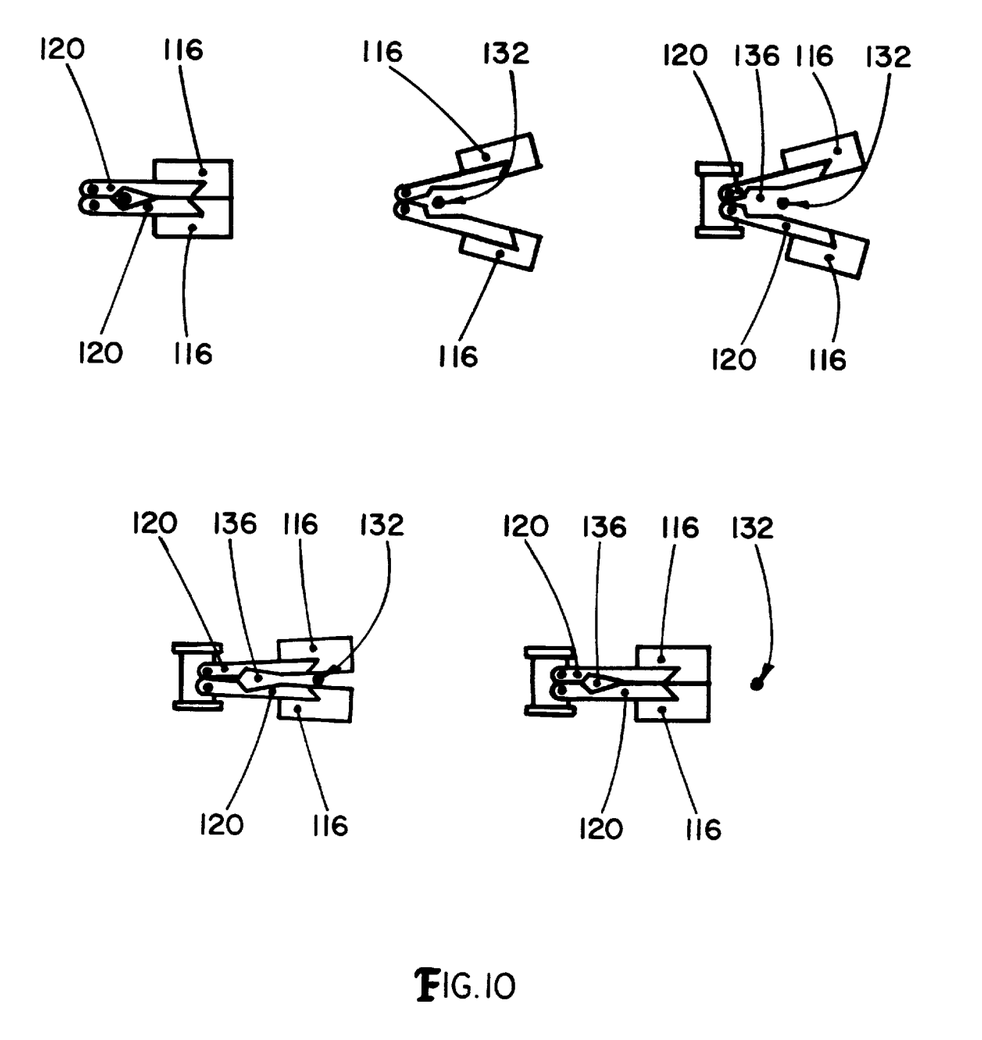
FIG. 10 is a progressive view of the arm and furnace movement according to the embodiment shown in FIG. 7.

FIG. 7–10 illustrate a second embodiment 100 of the fiber tester. The second embodiment 100 includes different test frame 110 with a separate mounting support system for the furnace. The test frame 110 has two rods 112 which screw into the base 36 and the micropositioner support 53. In this embodiment 100, there is no furnace support mounted between the base 36 and the micropositioner support 53. Instead, a furnace 114 which splits open so it can be moved into position around the fiber(s) 24 and then closed is used. The furnace 114 is of the type which employs heating elements in each half 116 of the furnace 114 and is used to avoid the problem of threading the fixed sample 50 through the furnace as in the first embodiment 10. Each half 116 of the furnace 114 is interconnected to a main furnace support column 118 by an arm 120. Each arm 120 is fastened at a point 122 to the support column 118 so that it can rotate about that point 122. The support column 118 includes springs 124, which force the arms together, thereby forcing the halves 116 of the furnace 114 together. The support column 118 is mounted to a column base 126 which is slidable in a slide base 128 mounted to the base 36. A handle 130 is provided on the support column 118 for allowing the user to slide the furnace 114 along the path of the slide base 128. Between the support column 118 and the test frame 110 is a pin 132 which extends upward from a pin base 134 mounted to the end of the slide base 128. As the furnace 114 is moved toward the test frame 110, the arms 120 of the furnace 114 are forced to part by the pin 132. The parting of the arms 120 in turn parts the halves 116 of the furnace 114, thereby allowing the furnace halves 116 to pass by and about the fiber(s) 24. Each arm 120 includes an indentation 136. Once the indentations 136 of each arm 120 reach the pin 132 during the sliding of the furnace 114, the arms 120 are forced back together by the springs 124. The movement of the arms 120 back together forces the halves 116 of the furnace 114 to close about the fiber(s) 24. FIG. 10 shows the progression of the arm and furnace movement as the support column 118 is moved toward the test frame 110 and the fiber(s) 24.

We claim:

1. An apparatus for testing at least one fiber comprising:

a base;

at least one sealed electrical feed-through in said base;

a test frame having a top, middle and bottom, where said bottom of said test frame is mounted to said base;

a micropositioner support at said top of the test frame;

a passage in said micropositioner support;

a furnace support at said middle of the test frame;

a passage in said furnace support to receive the fiber;

a load cell mounted to said base;

a bottom sample attachment connected to said load cell for receiving a bottom end of the fiber;

a micropositioner mounted to said micropositioner support and extending from said passage of the micropositioner support toward said load cell, where said micropositioner includes a motor and a means to measure movement of the motor;

a top sample attachment extending from said micropositioner and toward said load cell for receiving a top end of the fiber;

a furnace between said micropositioner and said load cell, which is mounted to said furnace support;

a passage in said furnace for receiving at least one fiber;

an enclosure to enclose the base and the test frame;

a seal to seal the enclosure and the base; and at least one sealed gas feed-through in said base to supply said sealed enclosure containing the fiber.

2. The apparatus of claim 1, further including a vacuum pump connected to the base through one of said gas feed-throughs to provide a vacuum inside said sealed enclosure.

3. The apparatus of claim 1, further including a mass flow control system comprising at least one mass flow control, at least one high purity gas supply, at least one regulator for said gas supply and tubing for interconnecting said gas supply to one of said gas feed-throughs.

4. The apparatus of claim 1, further including a support system for supporting said base comprising a frame, a top for mounting said base, pneumatic mounts interconnecting said frame and said top, and panels for mounting test data equipment.

5. An apparatus for testing at least one fiber comprising:

a base;

at least one sealed electrical feed-through in said base;

at least one sealed gas feed-through in said base;

a test frame having a top, middle and bottom, where said bottom of said test frame is mounted to said base;

a micropositioner support at said top of the test frame;

a passage in said micropositioner support;

a support column;

a support column base mounted to said support column;

a slide base mounted to said base away from said test frame, which slidably receives said support column base;

a handle mounted to said support column;

a pin base mounted to an end of said slide base which is between said support column and said test frame;

a pin extending from said pin base;

a load cell mounted to said base;

a bottom sample attachment connected to said load cell for receiving a bottom end of the fiber;

a micropositioner mounted to said micropositioner support and extending from said passage of the micropositioner support toward said load cell, where said micropositioner includes a motor and a means to measure movement of the motor;

a top sample attachment extending from said micropositioner and toward said load cell for receiving a top end of the fiber;

a furnace dividable into two separate halves movable into said middle of said test frame, which is an area between said micropositioner and said load cell;

an arm mounted to each half of the furnace for interconnecting each half to said support column;

an indentation in each arm for receiving said pin;

a spring interconnected between each arm and said support column for forcing said arms together;

a passage in each half of said furnace for closing about at least one fiber;

an enclosure to enclose the base and the test frame; and a seal to seal the enclosure and the base.

6. The apparatus of claim 5, further including a vacuum pump connected to the base through one of said gas feed-throughs.

7. The apparatus of claim 5, further including a mass flow control system comprising at least one mass flow control, at least one high purity gas supply, at least one regulator for said gas supply and tubing for interconnecting said gas supply to one of said gas feed-throughs.

8. The apparatus of claim 5, further including a support system for supporting said base comprising a frame, a top for mounting said base, pneumatic mounts interconnecting said frame and said top and panels for mounting test data equipment.

* * * * *